Feb. 28, 1933.  H. V. PUTMAN  1,899,720
NONOSCILLATING TRANSFORMER
Filed Oct. 6, 1931    9 Sheets-Sheet 1

WITNESSES:

INVENTOR
Henry V. Putman
BY
ATTORNEY

Fig. 3. Steep Fronted Lightning Surge

Feb. 28, 1933. H. V. PUTMAN 1,899,720
NONOSCILLATING TRANSFORMER
Filed Oct. 6, 1931 9 Sheets-Sheet 3

WITNESSES:

INVENTOR
Henry V. Putman
BY
ATTORNEY

Feb. 28, 1933.  H. V. PUTMAN  1,899,720
NONOSCILLATING TRANSFORMER
Filed Oct. 6, 1931  9 Sheets-Sheet 4

INVENTOR
Henry V. Putman
BY
Franklin E. Hardy
ATTORNEY

Feb. 28, 1933.  H. V. PUTMAN  1,899,720
NONOSCILLATING TRANSFORMER
Filed Oct. 6, 1931    9 Sheets-Sheet 5

WITNESSES:

INVENTOR
Henry V. Putman
BY
ATTORNEY

Feb. 28, 1933.  H. V. PUTMAN  1,899,720
NONOSCILLATING TRANSFORMER
Filed Oct. 6, 1931  9 Sheets-Sheet 6

WITNESSES:

INVENTOR
Henry V. Putman
BY Franklin E. Hardy
ATTORNEY

Feb. 28, 1933.  H. V. PUTMAN  1,899,720
NONOSCILLATING TRANSFORMER
Filed Oct. 6, 1931    9 Sheets-Sheet 7

WITNESSES:

INVENTOR
Henry V. Putman
BY
Franklin E. Hardy
ATTORNEY

Patented Feb. 28, 1933

1,899,720

UNITED STATES PATENT OFFICE

HENRY V. PUTMAN, OF SHARON, PENNSYLVANIA, ASSIGNOR TO WESTINGHOUSE ELECTRIC & MANUFACTURING COMPANY, A CORPORATION OF PENNSYLVANIA

NONOSCILLATING TRANSFORMER

Application filed October 6, 1931. Serial No. 567,210.

My invention relates to electrical apparatus employing windings of electrical conductors, the several parts of which are required to be insulated electrically from one another and from other parts of the apparatus such as the core and mechanical parts.

My invention is more particularly directed to an arrangement of the various parts of the winding and of the solid insulating material associated therewith in order to obtain maximum dielectric strength for a given amount of insulating material.

My invention is particularly adapted for application to high voltage oil insulated transformers although it may also be applied to low voltage transformers or to air insulated transformers. The invention is described more in detail as applied to shell type transformers, although the principles thereof are also applicable to core type transformers.

In order to protect the end turns of a transformer winding, connected to a transmission line conductor, from surge voltages such as arise from lightning on the transmission lines to which they are connected, it has been the practice to apply extra heavy insulating material to these end turns to insulate them from one another. Where the winding is made up of a plurality of coils, it has also been the practice to space the coils adjacent the high voltage end of the winding further apart than would be required to provide proper insulation under normal conditions of operation, in order to prevent surge voltages from breaking down the insulation between coils or from flashing across a group of coils adjacent the line end of the winding. This practice of providing higher insulation and greater spaces between the coils at the high voltage or line end of the winding is known as "padding".

Padding was first applied because failures on the end turns of the winding adjacent the line conductor showed this to be necessary. A mathematical study of the distribution of voltages along the winding later confirmed the necessity for "padding" and suggested that by a proper distribution of the voltage along the winding, the extreme stresses between the turns and coils at the end of the winding could be removed. This resulted in the provision of means whereby surge voltages, or high frequency voltages, would not build up on the line end of the winding but would be uniformly distributed throughout the winding in a manner similar to the distribution of voltages of normal frequency. See Patent 1,129,463 to Fortescue, issued February 23, 1915 and assigned to the Westinghouse Electric and Manufacturing Company.

During recent years, studies made with the use of the cathode-ray oscillograph have led to a more thorough understanding of the factors that determine the distribution and oscillation of surge voltages within transformer windings. Many devices have been developed for improving the distribution of voltages within windings and to prevent internal oscillations that may result from a poor distribution of voltage throughout the winding if the surge lasts a sufficiently long time, such as 100 to 300 micro-seconds.

About three or four years ago manufacturers of transformers experienced some rather serious failures of large transformers caused by lightning surges and as a result thereof often employed a greater amount of insulation between the high and low voltage windings of the transformer and between the high voltage winding and the core of the transformer. Prior to this time, the amount of this insulation, generally referred to as major insulation, had been designed to withstand an induced low frequency voltage equal to 2.73 times the normal voltage of the winding, for a period of one minute.

It should be noted that even though the surge voltages are uniformly distributed within the winding of a transformer, the major insulation at the high voltage end of the winding must, in all cases, withstand the maximum peak voltage produced by a surge. Cathode-ray oscillograph measurements of the voltage produced by lightning surges show the maximum value to be higher than was previously supposed, and hence, it was necessary to further increase the major insulation between the high and low voltage windings, and between the high voltage winding and ground. Measurements showed that if the major insulation were increased to a point where it would withstand a low frequency one minute test of 3.46 times normal voltage across the winding instead of 2.73, as previously used, the major insulation would be strong enough to withstand the lightning surges to be expected on transmission lines to which the transformer is connected when these lines are insulated in accordance with the approved standards of American Institute of Electrical Engineers.

A uniform distribution of surge voltages across the windings does not relieve the stress in the major insulation near the line end of the winding, but does materially reduce the voltage stress on the insulation between adjacent coils. Such a uniform distribution of voltages also prevents internal oscillations which might produce high stresses in the major insulation near the middle or near the grounded end of the high voltage winding, that is, at points where less major insulation might be used because of the lower normal voltage stress at these points.

It is an object of my invention to so arrange the windings and insulation of electrical apparatus such as transformers, as to render them more resistive to surge voltages.

Another object of my invention is to so arrange the coils and insulating material that the amount of solid or major insulation between adjacent conductors and adjacent coils of electrical windings for a given dielectric strength, may be reduced.

It is a further object of my invention to so arrange the layers of insulation or insulating barriers as to eliminate creepage surfaces, that is, to position the barriers substantially along equi-potential lines of the electrostatic field, or across the lines or voltage stress, so that no appreciable voltage difference exists between points on the same insulation surface.

Other objects of my invention will appear upon reading of the following description taken together with the accompanying drawings, in which.

Figure 1:
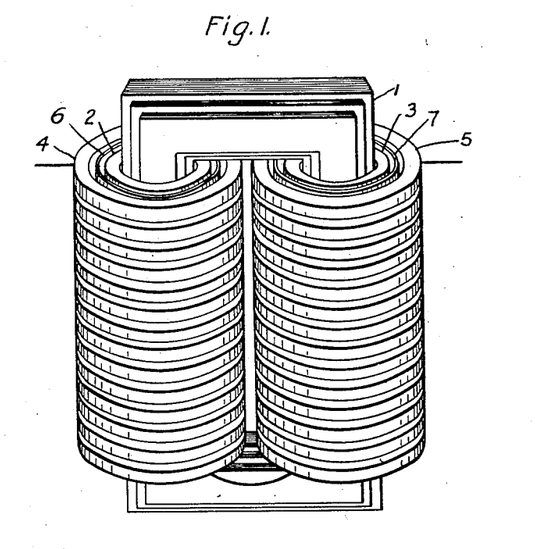
Figure 1 is a perspective view of the windings and core of a core type transformer.

Referring to Fig. 1 of the drawings, a core type transformer is illustrated in which a magnetic core structure 1 is provided having two winding legs upon which are mounted low voltage windings 2 and 3 and high voltage windings 4 and 5 that are separated by insulating barriers 6 and 7.

Figure 2:
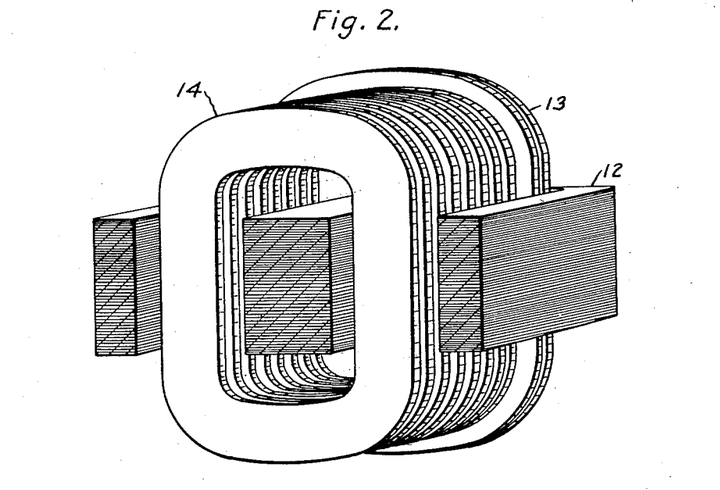
Fig. 2 is a perspective view of the core and windings of a shell type transformer with the front part of the core cut away.

Fig. 2 illustrates the core and coil arrangement of a shell type transformer in which the core 12 of magnetic material is so shaped as to form a central or winding leg about which the coils are placed. The core structure provides two openings or windows through which the conductors pass on opposite sides of the central or winding leg. In this type of construction the low voltage winding coils 13 may be positioned at the ends of the winding leg and the coils 14, forming the high voltage winding are positioned central thereof.

Figure 6:
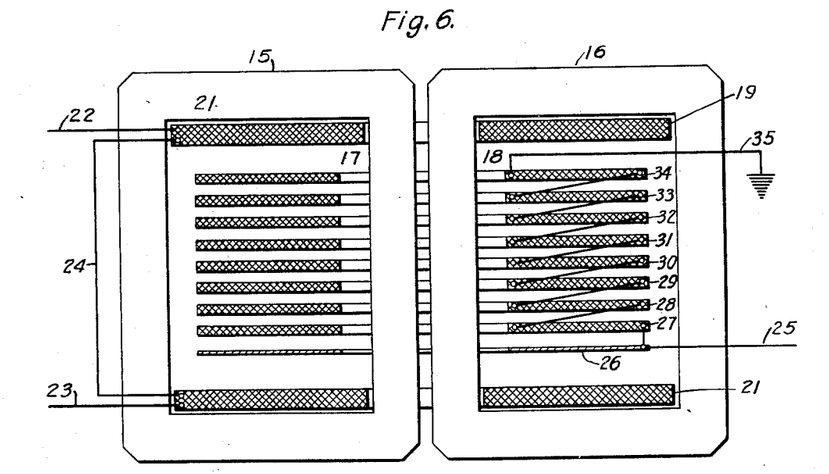
Fig. 6 is a horizontal sectional view through the windings and core of a shell type transformer.

The arrangement of the core and coils of a shell type transformer is clearly shown in Figure 6 in which the core may be constructed in two separate magnetic structures 15 and 16, each extending through the opening in the coil structure and each provided with a winding leg portion 17 and 18, respectively, which, together form the winding leg of the core structure. The low voltage winding is shown in two parts, 19 and 21, adjacent opposite ends of the winding leg, these two portions of the low voltage winding being provided with terminal conductors 22 and 23, respectively, and being connected together by means of the conductor 24.

A line terminal conductor 25 is connected to a static plate 26 that nearly surrounds the winding leg, and to the first of a series of coils 27, 28, 29, 30, 31, 32, 33 and 34, which together comprise the high voltage winding of the transformer. The last coil 34 of the winding is connected to ground through a terminal conductor 35. It has been shown that the distribution of surge voltages within a long slender column of coils, such as is used in core type transformers, (Fig. 1), is very poor while the distribution of surge voltages within a short group of relatively wide coils, such as used in the shell type transformer, is very good.

Figure 3:
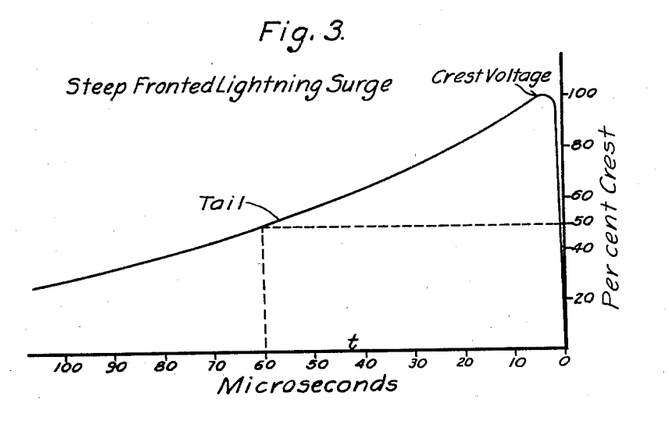
Fig. 3 is a curve illustrating a steep fronted surge voltage wave.

Figure 3 illustrates a typical surge voltage wave having a steep wave front and falling to one-half its maximum value in 60 microseconds.

Figure 4:
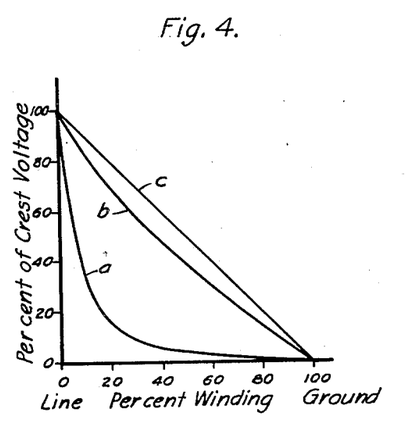
Figs. 4 and 5 illustrate curves showing the distribution of surge voltages such as shown in Fig. 3 through electrical windings.

In Fig. 4 the curve "$a$" shows the initial electrostatic voltage distribution of such a surge in a long slender column of coils such as the structure shown in Figure 1, and the curve "$b$" shows the initial electrostatic voltage distribution in a winding formed of a short group of wide coils as shown in Figs. 2 and 6. The curve "$c$" represents uniform distribution throughout the winding that would exist under normal voltage excitation of the winding.

Figure 5:
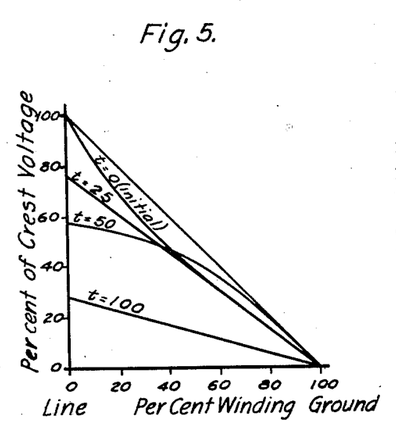

In the construction illustrated in Fig. 6 the static plate 26 adjacent the first or high voltage coil of the winding is effective to distribute the surge voltage within the conductors of the first coil. Such a winding will not have oscillations of any appreciable magnitude even for very long surges. Figure 5 illustrates curves showing the distribution of surge voltages at the times indicated, "$t=0$" showing the initial distribution of a surge voltage having a steep wave front and a long tail, as shown in Fig. 3, across a winding of the construction shown in Fig. 6. The curves $t=25$, $t=50$ and $t=100$ show, respectively, the distribution of the same surge voltage across the winding for times corresponding to 25, 50 and 100 micro-seconds after the initiation of the wave.

As pointed out above, in their attempts to make transformers more resistive to surge voltages, engineers have, in the past, concentrated their efforts to the use of means for providing a more uniform distribution of surge voltages, either within the individual coils, or between adjacent coils of the winding and have appreciably increased the amount of major insulation employed for a winding designed to withstand a given voltage.

The present invention provides an arrangement of coils and insulation for more effectively utilizing a given amount of insulation to resist voltage surges. I also arrange the insulation structure for electrical windings as to provide a greatly increased resistance to voltage for a given amount of insulating material than is provided with previously employed insulation structures.

By tests on a number of different kinds of insulating structures, it has been shown that even with the same shaped surge, there was no fixed ratio between the impulse strength and the 60 cycle strength. By impulse strength is meant the dielectric strength of the insulation when subjected to surge voltages. It is well known that for certain insulation structures, such as a string of line insulators, the ratio of the impulse strength to the 60 cycle strength, known as impulse ratio, depends only on the steepness of the wave front and the duration of the surge voltage wave. Different models of insulation, each having the same 60 cycle strength, were tested and it was found that they failed at different values of surge voltages even though surges of the same wave shape were used. An investigation of this phenomenon indicated that those structures which depended for their 60 cycle dielectric strength largely upon creepage surfaces, showed but little increase in dielectric strength over their 60 cycle strength when subjected to surge voltages, but that those structures that depended on insulation barriers so arranged that a breakdown must result in a puncture through the barriers would withstand much greater surge voltages.

Figure 7:
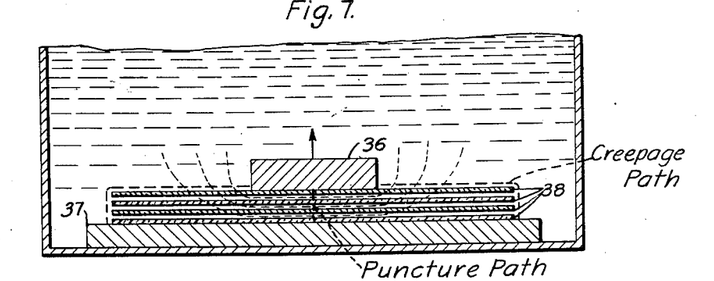
Figs. 7 and 8 are views illustrating different models or arrangement of insulating barriers between a conductor and a structure from which the conductor is insulated that have the same 60 cycle strength but widely different surge voltage strengths.
Figure 8:
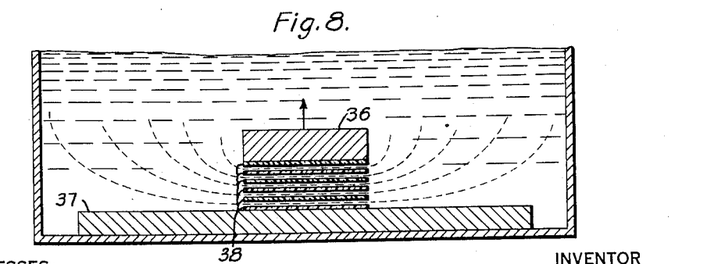

Figs. 7 and 8 represent two simple insulation models submersed in oil, which can be designed to have the same 60 cycle strength, and, when so designed, have widely different surge voltage strengths. In each of these simple insulation models an electrode 36 is separated from a ground plate 37 by a number of insulation barriers 38. In Fig. 7 the insulation barriers extend beyond the edges of the electrode a relatively long distance. The dotted lines shown in Fig. 7 represent the approximate location of the electrostatic equipotential surfaces, and it will be noted that the several insulation barriers cut the electrostatic surfaces obliquely so that there is a difference of potential between different points on the surfaces of any insulation barrier. Fig. 8 represents a structure similar to that shown in Fig. 7 except that the insulation barriers do not extend beyond the edges of the electrode. The number of barriers employed in the construction of the model shown in Fig. 8 is so determined as to make its 60 cycle strength exactly the same as the 60 cycle strength of the model in Fig. 7. It will be noted in connection with Fig. 8 that the insulation barriers are substantially coincident with the equipotential surfaces of the electrostatic field, the direction of which is illustrated by the dotted lines. The insulation barriers in Fig. 8, therefore, do not cut the electrostatic surfaces obliquely, and there is no appreciable difference in potential between points on any insulation barrier.

When surge tests are applied to the insulation structures described in Figs. 7 and 8, it is found that the impulse strength of the model shown in Fig. 8 is very much greater than that shown in Fig. 7. The conclusion which I have reached from these and similar investigations is that it is undesirable to have the insulation barriers so disposed as to cut electrostatic surfaces obliquely, and thus form creepage surfaces. To get the maximum impulse strength, the insulation surfaces should be as nearly coincident with the electrostatic equipotential surfaces as is possible, and in my invention I have worked out practical designs for shell and core type transformers in which this arrangement is closely approximated.

While the particular models described in Figs. 7 and 8 do not represent insulating structures employed in actual transformer design, they do illustrate the principle that creepage surfaces are undesirable. In the practical application of this principle to actual transformer designs, I propose, therefore, to employ an arrangement of insulating barriers such that there shall be substantially no difference of potential between different points on the surface of any layer of insulating material. This arrangement of the insulating barriers ensures that if voltage of a sufficiently high value to cause a break-down of the insulating material is applied to an electrical winding, the rupture of the insulating material will always take place by a puncture of the insulating barriers and this will be true not only for a failure from the high voltage end of a winding to ground or to the low voltage winding, but also from any coil in the winding to ground, and from any coil of the winding to its adjacent coil or any other coil in the winding.

I also propose to arrange the insulating material in such manner that the dielectric strength of the barriers existing between any two points of potential difference within the winding will be substantially proportional to the difference in potential between these points under the worst surge voltage conditions, in case the surge voltage should have a different distribution within the winding than the normal or 60 cycle voltage.

Figure 9:
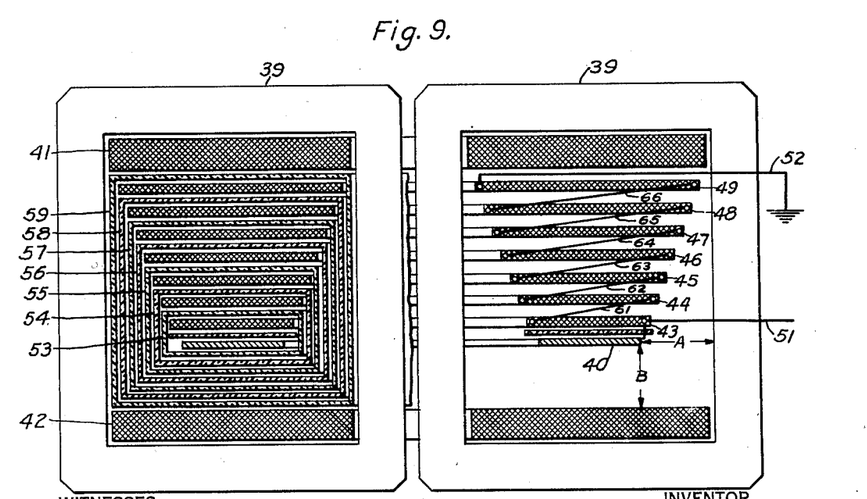
Fig. 9 is a horizontal sectional view of a shell type transformer illustrating the coils and insulating barriers arranged in accordance with one embodiment of my invention.

Referring to Fig. 9, which is a horizontal sectional view of a transformer showing a core structure comprising two stacks of closed magnetic laminations 39, the adjacent sides of which form the winding leg of the transformer about which the low voltage windings 41 and 42 are placed adjacent to the ends thereof. Between the low voltage windings are placed the coils 43 to 49, inclusive, forming the high voltage winding. A static plate 40 and the coil 43 comprising the high voltage end of the winding are connected to the line terminal conductor 51. The low voltage end of the winding is connected to ground by means of the conductor 52. Insulating barriers 53 to 59 are shown in cross section in the left hand window of the core surrounding each of the several coils. For the sake of simplicity and to better show the connections between the coils, these insulating barriers are not shown in the right hand window, that is, within the opening in the core structure 39, although it will be understood that they extend continuously about each of the several coils. It will be noted that the coils, proceeding from the high tension end of the winding toward the low tension end, that is, from the coil 43 to the coil 49, are of increasing external diameters and decreasing internal diameters to accommodate the barriers 53 to 59, inclusive.

The barrier 53 surrounds the coil 43 and the line static plate, and each of the succeeding barriers 54 to 59, inclusive, is larger in size and surrounds one of the coils 54 to 59, inclusive, together with the smaller coils of the coil stack and the barriers associated therewith, so that the entire barrier structure forms a series of nested barriers, each barrier proceeding from the smaller to the larger, enclosing an increasing number of winding coils.

Figure 10:
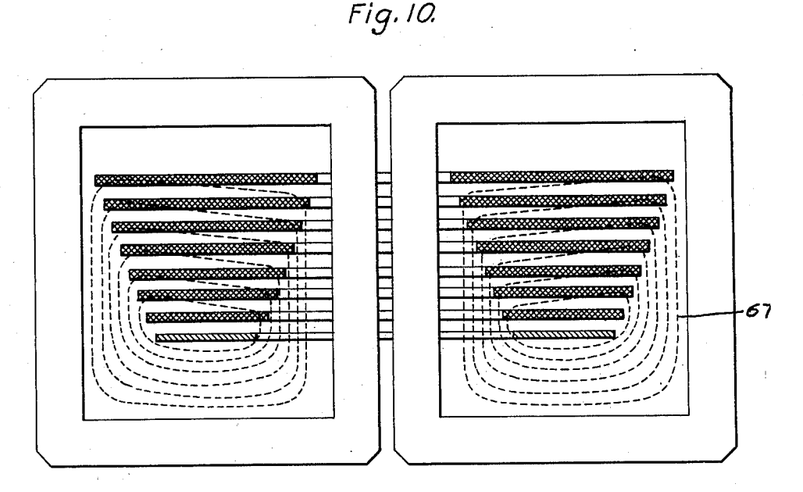
Fig. 10 is a view showing the approximate location of the equipotential surfaces of the electrostatic field under normal voltage in the arrangement of the coils illustrated in Figure 9.

Fig. 10 illustrates the approximate distribution of the equipotential surfaces of the electrostatic field for the winding shown in Fig. 9 under normal voltage conditions. The several coils of the stack are connected in series by the conductors 61 to 66, inclusive, shown in Fig. 9, the inner end of the smaller coil being connected to the outer end of the adjacent larger coil. These two points on adjacent coils will, therefore, be at the same potential as shown by the dotted lines 67 in Fig. 10, these several equipotential surfaces extending about the coils within the window of the core structure, which structure is at ground potential.

It will be noted that the insulation barriers shown in Fig. 9 follow approximately the contours of the equipotential surfaces shown in Fig. 10. Therefore, the voltage stress at any particular point is normal to the surface of the insulating barrier. It will also be noted that a failure from the coil 43 to the core, that is to ground, can occur only by puncturing the several barriers 53 to 59, inclusive. Also that a failure of the insulation between the coils 43 and 49, for example, requires a puncture of the barriers 53 to 58, inclusive. Similarly, a failure between any two points within the winding can occur only by puncturing a number of barriers, the dielectric strength of which is proportional to the voltage between these points in the winding.

Since the thickness of the barriers may be controlled, it is possible to so design them that the dielectric strength of the barriers will be proportional to the surge voltage between various points of the winding for any particular voltage distribution. I have, however, found it preferable to employ a static plate adjacent the first coil of the winding, as shown in Figs. 6 and 9. By employing the static plate and a relatively few wide coils, it is possible to obtain very nearly uniform distribution of surge voltages throughout the high voltage winding. The insulation structure may, therefore, be so designed that the distribution of material that is most effective to withstand the low frequency induced voltage test is also most effective to withstand surge voltages.

Figure 11:
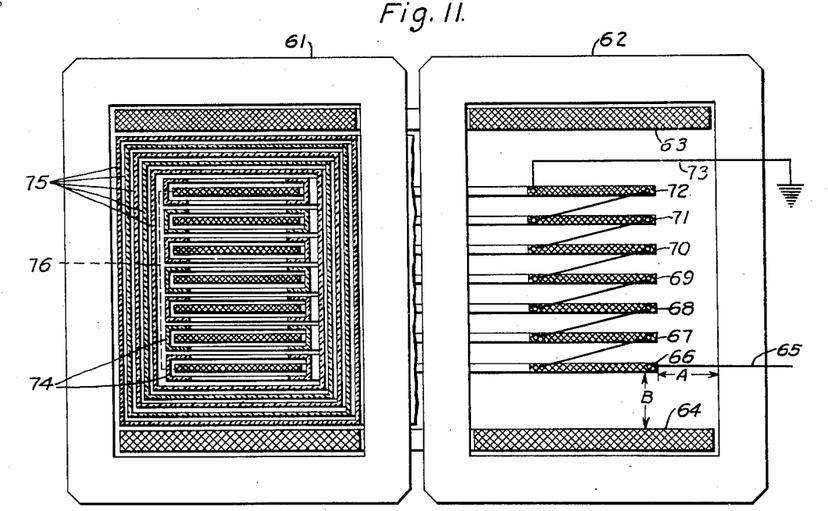
Fig. 11 is a horizontal sectional view through the core and coils of a shell type transformer illustrating a conventional arrangement of the coils and insulating barriers.
Figure 12:
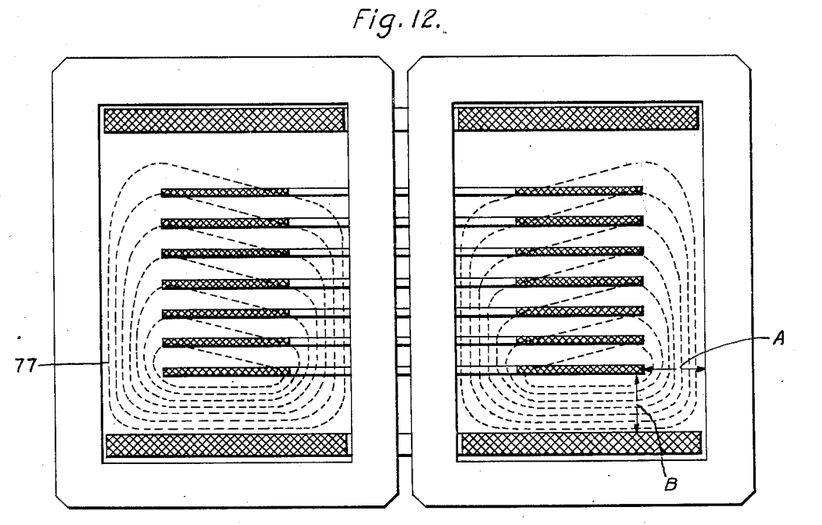
Fig. 12 is a view showing the approximate location of the equipotential surfaces of the electrostatic field about the coils arranged as illustrated in Figure 11.

In order that the effectiveness of my proposed insulating barrier construction may be readily understood, I have illustrated in Figs. 11 and 12 the conventional construction and the approximate distribution of equipotential surfaces corresponding to that particular construction.

Fig. 11 illustrates a core comprising two stacks of magnetic material 61 and 62, each providing a magnetic path surrounding a portion of the winding structure. The adjacent legs of the two stacks together form the winding leg of the transformer. The low voltage winding coils 63 and 64 also appear adjacent the ends of the windows about the winding leg of the core, and the coils 66 to 72, inclusive, are connected in series to form the high voltage winding that is connected between the line terminal conductor 65 and the ground terminal conductor 73. With this construction, it is the usual practice to provide insulating channels 74 about the edges of the several coils and a series of barriers 75 surrounding the entire stack of coils in the space between the coil stack and the iron core, and also between the ends of the stack and the low voltage coils as shown in the window at the left of the figure.

Fig. 12 illustrates approximately the equipotential surfaces 77 that exists about the coils of the high voltage winding illustrated in Fig. 11. It will be noted by reference to Fig. 12, that the voltage stress is very high about the outside corner of the end coil 66 that is connected to the high tension terminal. Because of this high concentration of voltage stress, it is necessary that the distance A from the high voltage coil to the core, or ground, and the distance B from the high voltage coil 63 to the low voltage coil 64 be relatively large. It is this stress at the corners of the high voltage winding group that determines the major insulation clearances, that is dimensions A and B required for a given transformer design. It will be noted by reference to Fig. 12 that the major insulation required between the coil 72 and the low voltage coil 63, or between the coil 72 and the core of the transformer is subjected to very low stresses. It will be noted that, in the construction shown in Fig. 9, in which the insulation is arranged in accordance with the principle of my invention, this uneven distribution of stress throughout the major insulation has been largely eliminated and that the insulation is stressed substantially uniformly throughout.

Referring to Fig. 11, it will be noted that if the stress concentration at the corner of the coil 66 is sufficient to puncture the conductor insulation and the insulating channel 74 around the edge of the coils, there exists a creepage path the full length of the winding group shown by the dotted line 76. It will be noted by referring to Fig. 12 that this creepage path extends across the equipotential lines in such manner that substantially the entire voltage of the high tension winding exists along this path. Failure of the insulation lengthwise of the group therefore, takes place readily when the winding is subjected to sufficient surge voltages. It has, therefore, been necessary to provide sufficient distance between coils arranged, as shown in Fig. 11, to make the length of this creepage path sufficiently great to possess the necessary surge voltage dielectric strength.

In the construction shown in Fig. 11, the space between the coils of the high voltage winding are much greater than are required for proper circulation of the cooling oil between the coils. In the construction that I propose, as illustrated in Fig. 9, the spacing between the coils of the high tension winding need be only sufficient for the insulating barriers between coils and for the circulation of the cooling oil. The construction shown in Fig. 9, is therefore, much more economical of space, since the coils may be placed closer together and also because the coils at the low voltage end of the winding may be wider, thereby requiring less space between the core and edges of the coils and much less insulation between these points.

I am also able to save additional space between the grounded end of the high voltage winding and the low voltage winding, that is, instead of having the full insulation between the coil 72 and the low voltage coil 63, as in Fig. 11, I employ a relatively small amount of insulation between the coil 49 and the coil 41, as shown in Fig. 9. A single insulating barrier is shown in this position in Fig. 9. It will be appreciated that each of the illustrated barriers may represent a single barrier or more, if necessary, to provide the required dielectric strength.

The reduction in the spaces between the coils of the high tension winding and between the grounded end of the high tension winding and the low voltage winding results in low reactance in these windings. This is a desirable feature, because it is then possible to employ, in larger sizes of transformers, the simple construction illustrated in Fig. 9, in which a single high tension winding is positioned between two low tension winding groups. In these larger sizes which inherently have high reactances it has previously been necessary to employ a greater number of high tension and low tension winding groups in order to bring the reactance down to the desired value.

Figure 13:
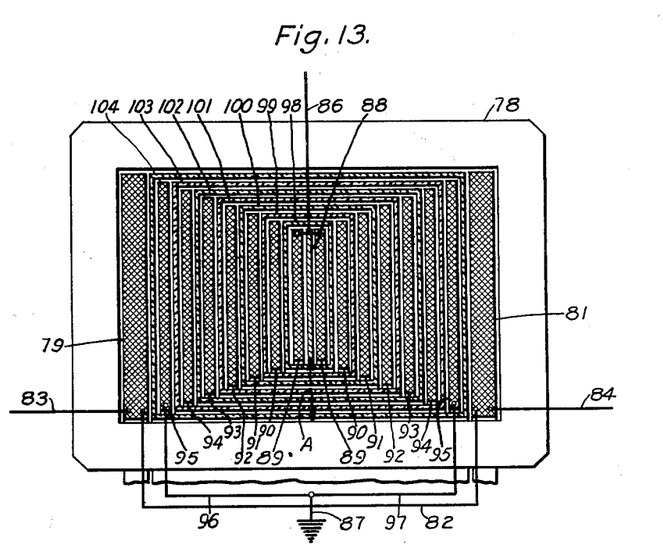
Fig. 13 is a horizontal sectional view through one window, or one-half of the core structure, of a shell type transformer showing an arrangement of the coils and insulating barriers organized in accordance with another embodiment of my invention.

One arrangement of winding coils that is especially adapted for large transformers and which employs the principle of my invention is illustrated in Fig. 13. In Fig. 13 one stack of iron laminations 78 surrounding a single window is illustrated, since the two core stacks in a sectional view through the windings passing through the window of the core are similar. In the construction shown in Fig. 13, two groups of low tension winding 79 and 81 are illlustrated and are placed at the ends of the winding leg similar to the construction illustrated in Figs. 9 and 11, the coil groups being connected together by a conductor 82 and connected to the terminal conductors 83 and 84. Coil stacks, each having the trapezoidal appearance in cross-sectional view of the high voltage winding in Fig. 9, are provided, and are connected in parallel circuit relation between the high voltage conductor 86 and the ground conductor 87, the stacks being so positioned that the smaller or high tension coils are adjacent one another at the center of the entire winding and between which the static plate 88, connected to the terminal conductor 86, is positioned. The successive coils 89 to 95 of the two stacks extend from the center of the winding to points adjacent the low voltage winding groups 79 and 81, respectively, and are connected by means of conductors 96 and 97 to the ground conductor 87.

A series of insulating barriers 98 to 104 are positioned, the smaller nesting within the larger, the inner barrier 98 surrounding the high tension terminal coils 89 and each of the larger barriers 99 to 104, inclusive, surrounding these coils together with the next larger coils of the two winding groups adjacent the next smaller insulating barrier.

It will be noted that in the construction shown in Fig. 13, the grounded ends of the high voltage winding groups, that is, coils 95 are adjacent to the low voltage windings 79 and 81 so that very little insulation is required between the high voltage and low voltage windings. This results in decreasing the length of the entire winding structure, and in a low reactance which is very desirable, particularly for the larger sizes of transformers. With this construction also, there is no concentration of stress at the corners of the high voltage coil, and hence, the major insulation corresponding to the distance A may be appreciably less than that required in the structure shown in Figs. 11 and 9.

Figure 14:
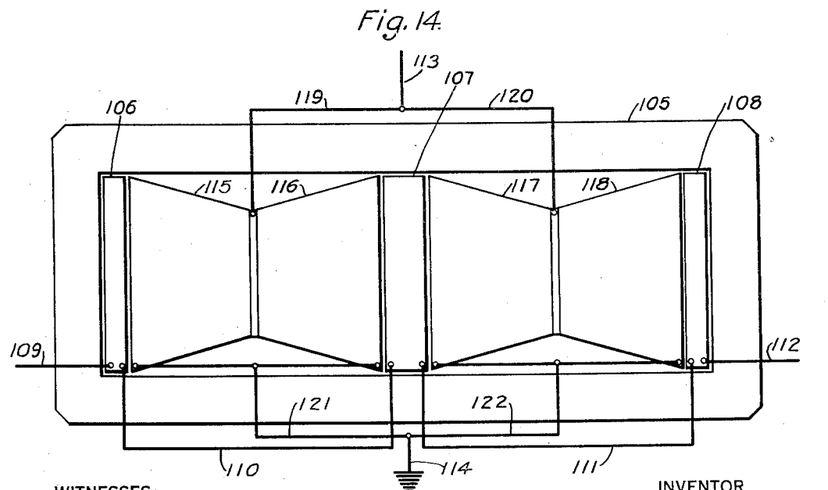
Figs. 14, 15 and 16 are views illustrating several arrangements of the coil stacks that may be employed in accordance with my invention.
Figure 15:
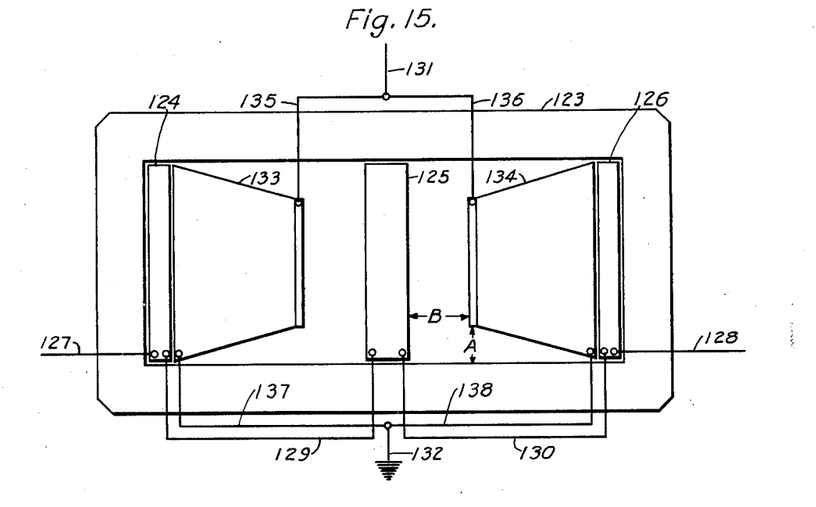

Figs. 14 and 15 illustrate other arrangements of windings in which graded coil sizes are employed in the high tension winding. In each of these figures a single core window is illustrated and the coils are shown in outline only, it being understood that the high tension coils in Fig. 14 are provided with barriers similar to those shown in Fig. 13 and each of the high tension winding stacks shown in Fig. 15 are provided with barriers similar to those shown in Fig. 9.

Referring to Fig. 14, the iron laminations 105 provide a core window within which low tension coils 106, 107 and 108 are provided and are shown as connected in series between the terminal conductor 109 and the terminal conductor 112 by conductors 110 and 111. A parallel connection could be used if desired. The coil group 107, since it is between the two double stacks of high tension windings will have coils corresponding in number to the sum of the coils in groups 106 and 108. The high tension winding is connected between the line terminal conductor 113 and the ground terminal conductor 114 and is divided into four groups of graded coils 115, 116, 117 and 118. The groups 115 and 116 are connected together and to the line terminal conductor 113 by means of the conductor 119, and the two winding groups 117 and 118 are connected together and to the line terminal conductor 113 by means of the conductors 120 and 119. The ground, or low voltage, ends of the winding groups 115 and 116 are connected to the ground terminal conductor 114 by means of conductor 121, and the ground, or low voltage, ends of the winding groups 117 and 118 are similarly connected to the ground terminal conductor 114 by means of the conductor 122.

In Fig. 15 the core structure 123, one window of which is shown, accommodates the low voltage winding groups 124, 125 and 126, winding group 125 having the same number of coils as the combined coils contained in groups 124 and 126. The low voltage coil groups are shown connected in series between the terminal conductors 127 and 128 by means of the conductors 129 and 130, although it will be understood, that a parallel connection may be used. The high voltage winding is connected between the line conductor 131 and the ground conductor 132 and comprises two winding groups 133 and 134, respectively, shown in outline and provided with insulating barriers similar to those shown in Fig. 9.

The winding groups 133 and 134 are connected, respectively, to the line terminal conductors 131 by means of conductors 135 and 136, and to the ground terminal conductor 132, respectively, by means of conductors 137 and 138.

Figure 16:
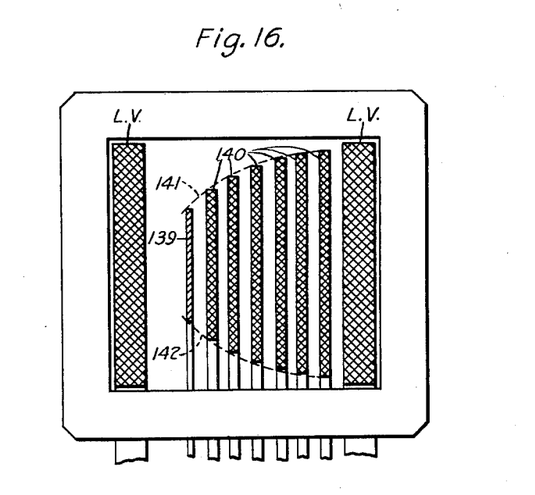

As has been pointed out with reference to Fig. 12, the major insulation clearances A and B are determined by the concentration of the voltage stress at the corners of the coil group at the line end of the winding. In the arrangement of coils that I have proposed, this concentration is less severe because of the increasing width of the successive coils of the winding. This is clearly shown in Fig. 10 and because of this, the major insulation clearances A and B required in the construction shown in Fig. 9, can be considerably less than those required in the construction shown in Fig. 11. I have found, however, that for the very best results it is desirable to arrange the coil widths and the widths of the static plates adjacent the high voltage coils so that the corner of the coil group, as viewed in section, is more or less circular or rounded as shown by the dotted lines 141 and 142 in Fig. 16. In this Figure 139 indicates the static plate and 140 the several coils of the high tension winding.

It will be noted that, in the constructions so far described, the winding coils have been connected together with so-called "start-finish" connections; that is, the inner end of one coil is connected to the outer end of the adjacent coil. It has been shown both mathematically and experimentally that this type of connection results in better distribution of surge voltages than the so-called "start-start, finish-finish" connections, that, where the inner conductors of adjacent coils and the outer conductors of adjacent coils are alternately connected together. It has been shown, however, that after the first few coils, beginning with the high voltage end of the winding, there is but slight difference in the voltage distribution between "start-finish" connections and "start-start, finish-finish" connections.

It has, therefore, been found desirable in certain cases to connect the first few coils of the winding with "start-finish" connections and the remainder of the coils with "start-start, finish-finish" connections, since the latter are easier to manufacture. In the so-called "start-start, finish-finish" connections, the inner ends of adjacent coils and the outer ends of adjacent coils are connected together, as shown in the connections 155 to 158, inclusive, between coils 147 to 151 of Fig. 17.

Figure 17:
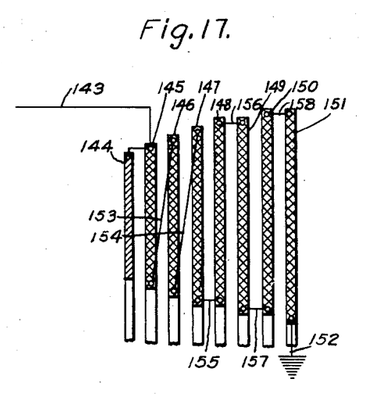
Fig. 17 is a schematic illustration showing a modified connection of a stack comprising the high voltage winding of a transformer.

In Fig. 17 the line terminal conductor 143 is connected to a static plate 144 and to the first coil 145 of the winding which comprises the stack of coils 145 to 151, inclusive, the latter of which is connected to the ground conductor 152. The first three coils 145, 146, and 147, of the winding are connected together with so-called "start-finish" connections. That is, the inner end of the conductor comprising the coil 145 is connected by means of conductor 153 to the outer conductor of the coil 146, and the inner end of coil 146 is connected to the outer end of coil 147 by means of conductor 154. The remaining coils of the winding are connected together by conductors 155 to 158, inclusive, that join corresponding ends of adjacent coils.

Figure 18:
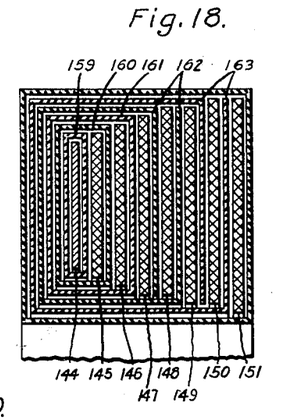
Figs. 18, 19 and 20 illustrate several arrangements of the coils and insulating barriers comprising other embodiments of my invention.

In the constructions previously described, I have shown insulation barriers between individual coils completely surrounding the coil and also including the coils of lesser width within the winding, the number of barriers corresponding to the number of coils employed. With the connections shown in Fig. 17, it is possible to use barriers positioned, as shown in Fig. 18, in which the number of barriers between a coil and ground is less than the position of this coil from the low voltage end of the winding. Referring to the barriers 159 to 163, inclusive, in Fig. 18, the first three barriers surround, respectively, the static plate and the first two coils 144, 145 and 146, and are nested in the same manner as described with reference to the first three coils in Fig. 9. The barrier 162 extends between the coils 147 and 148, surrounds the coils 148, 146 and 145 and the static plate 144, and then extends between the coils 148 and 149, and the barrier 163 extends between the coils 149 and 150 and surrounds the high voltage end of the group, being then brought between coils 150 and 151, so that the barriers 162 and 163 each form the dielectric barrier between adjacent surfaces of three coils.

Figure 19:
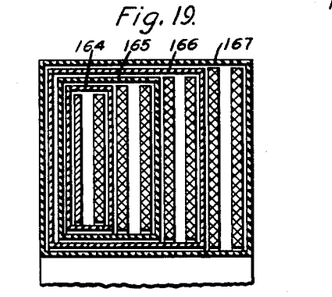

Another such arrangement of the barriers is to provide complete closed cells, each barrier or cell surrounding more than one coil, as shown in Fig. 19, in which the several barriers 164, 165, 166, and 167 each include two elements not enclosed in the next smaller barrier.

In the winding so far discussed, it has been assumed that the high voltage winding is of a common type having one end grounded either solidly or through an impedance so that the winding has a high voltage and a low voltage end. Where the winding is ungrounded or where it is desired to use either end of the high voltage winding, as the line terminal end thereof, the method of insulation illustrated in Fig. 20 may be employed. In this construction the high voltage winding comprises the coils 168 to 175, inclusive, and each end coil is provided with full line-to-ground insulation. The coils 168 to 171, inclusive, forming one-half of the winding stack, are graded in size and insulated by means of nested barriers 176, 177, 178 and 179 in a manner previously described, and the remaining coils 172 to 175, inclusive, are similarly insulated by the barriers 180 to 183, inclusive. Each nested barrier group insulates one-half of the winding stack for one-half of the total voltage across the entire winding. The remaining barriers 184, 185 and 186 surround both groups of windings, as shown.

Figure 20:
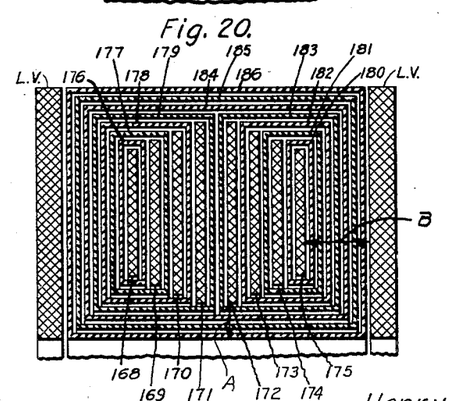

It will be noted that with this construction, a failure from one end of the group to the other, that is, between coils 168 and 175 can occur only by puncturing the several barriers 176 to 183, inclusive, as shown by the dotted line between these coils. It will also be noted that the major insulation between any coil and ground is proportional to the distance of that coil from its nearest end coil, considering the end coil to be the high voltage coil of the winding. In this construction, there are no creepage surfaces. It will also be noted that the major insulation clearance A, required at the center of the group between the windings and ground, is less than at the ends of the group. I have found this satisfactory, since there is less concentration of stress at the point A than at the corners of the coils in the region indicated by B.

Figure 21:
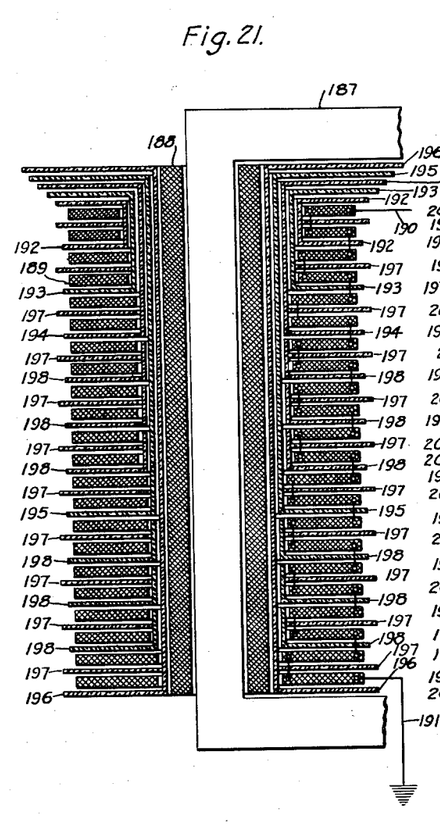
Figs. 21 and 22 are vertical sectional views illustrating the use of insulating barriers applied to core type transformers in accordance with the teachings of my invention.

In the application of my invention to core type transformers, I find it unnecessary to continue the insulating barriers along the outside of the column of coils, since the spacing between the coils and the tank wall is much greater than that between the coils and the core that passes through the center of the column of coils. Fig. 21 shows a core structure 187 about which a long cylindrical low voltage winding 188 is placed. The high voltage winding consisting of a stack of disk shaped coils 189 surrounds the low voltage winding and is connected between the high voltage terminal conductor 190 and the ground conductor 191. A group of insulating barriers 192 to 196, inclusive, extend between the column and the core at the top, or high tension end, of the winding and downwardly within the column of coils, each barrier, after continuing downwardly along the inner side of the column coils, being turned outwardly between adjacent coils at spaced intervals along the column. For example, the barrier 192 extends downwardly past the two top coils and then outwardly between the second and third coils from the top of the stack, and the barrier 193 extends downwardly past the first four coils and then outwardly between the fourth and fifth coil of the stack. Disk shaped barriers 197 are shown between the even numbered and odd numbered coils of the stack and below the barrier 194, that is, below the sixth coil from the top, barriers 198, having an L-shaped section, are employed that extend along the inner side of a pair of coils, extending outwardly between that pair and the adjacent pair of coils.

Figure 22:
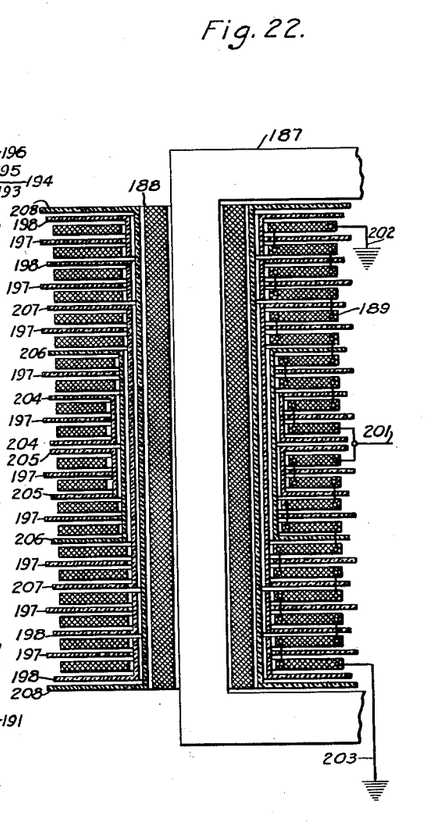

Fig. 22 shows a construction employing a core 187 and a low voltage winding 188 arranged, as shown in Fig. 21, but, in this construction, the high voltage or line conductor 201 is brought in at the middle of the stack of high voltage coils, and both ends of the windings are grounded at 202 and 203. A barrier 204 extends along the inner edges of the two coils immediately above the center of the winding and outwardly between these two coils and the adjacent coils of the stack, and a similarly shaped barrier 205 extends along the inner edges of the two coils immediately below the center of the stack and out between these and adjacent coils. Barriers 206, 207 and 208, are similar in construction, and are positioned between the inner edges of the coils and the core, and extend along the inner side of the column of coils, for varying distances, and then outwardly between adjacent coils. The coils surrounded on three sides by the barriers thus far named with respect to this figure, are grouped in pairs, there being a disk shaped barrier 197 between the two coils of each pair.

Barriers 198, that are L-shaped, as viewed in cross section, are also provided, and placed adjacent the ends of the columns for providing insulation between pairs of coils and the adjacent coil and core. It will be noted that, in the structures shown in Figs. 21 and 22, I have shown the greater part of the insulating barriers interleaved between the coils near the high voltage end of the winding, since the surge voltage distribution in a core type column of coils is not uniform and the stress between adjacent coils is very great between those coils near the high tension end of the winding.

The barriers illustrated in Figs. 21 and 22 are so positioned that creepage surfaces have been eliminated at the high voltage ends of the windings where the voltage stress is highly concentrated and a failure of the insulation in this region must occur as a result of insulation puncture between adjacent coils or between the end coil and ground.

By employing insulating barriers arranged in the manner described in the various modifications of my invention, it will be noted that creepage surfaces have been eliminated and that the amount of insulating material and the clearances between windings is less than in previously employed arrangements of insulating material. The amount of insulation and the insulation clearances used in high voltage windings of transformers are determined, at present, by the magnitude of surge voltages caused by lightning to which such windings might be subjected, and not by the normal voltage stress imposed on the insulation. This is true regardless of whether or not means is employed for providing a substantially uniformly distributed surge voltage within the winding.

My invention, therefore, makes it possible to obtain a much higher surge voltage dielectric strength with a given amount of insulating material than has been obtained previously. This reduction in the amount of insulating material required is very desirable not only because it permits of a saving in space, but also the copper and iron losses of the transformer may be reduced and the magnetizing current will be less. Consequently, the weights of materials and dimensions of parts will be less where the arrangement of materials in accordance with my invention is employed than in previous designs. This is very desirable, particularly in large high voltage transformers where the problems of handling and shipping are frequently difficult ones.

Since many modifications may be made in the arrangement of parts within the spirit of my invention, I do not wish to be limited otherwise than by the scope of the appended claims.

I claim as my invention:

1. In an electrical apparatus, a winding comprising a plurality of coil structures connected together, and a series of insulating barriers for said coil structures, each barrier of the series surrounding a different number of coil structures.

2. In an electrical apparatus, a winding comprising a plurality of coils, and a series of nested insulating barriers for said winding, each larger barrier of the series enclosing the lesser barriers and at least one coil not included within a lesser barrier.

3. In an electrical apparatus, a winding comprising a plurality of coils of graded sizes, and a series of nested insulating barriers for said winding, each larger barrier of the series enclosing the lesser barriers and a coil larger than any contained within a lesser barrier.

4. In an electrical apparatus, a winding comprising a plurality of flat coil structures arranged along a common axis, and insulating barriers arranged between the individual coils and about the several coils in one end of the stack along substantially equipotential surfaces of the electrostatic field.

5. In an electrical apparatus, a winding comprising a stack of coil structures, a plurality of insulating barriers arranged between adjacent coil structures and extending about the coil structures and the barriers contained in that portion of the stack between one end thereof and the said adjacent coil structures.

6. In an electrical apparatus, a winding comprising a stack of coils connected together, a core structure of magnetic material extending through the winding, and a plurality of insulating barriers of different dimensions between said winding and said core, all of said barriers extending across the path of voltage stress between a relatively high voltage coil and said core, said barriers of successively increasing dimensions extending across the path of voltage stress between coils of successively decreasing voltage.

7. In an electrical apparatus a winding comprising a stack of coils arranged along a common axis and a series of insulating barriers for said coils each barrier being arranged to enclose a different number of coils than the other barriers.

8. In an electrical apparatus, a winding comprising a plurality of coil structures electrically connected together, and a series of nested insulating barriers for said coil structures, the surfaces of each larger barrier of the series surrounding the smaller barriers and at least one coil structure not included within a smaller barrier, and positioned substantially along equipotential surfaces between adjacent coil structures.

9. In an electrical apparatus, a winding comprising a pluarlity of coils of graded sizes, and a series of nested insulating barriers for said winding, each of said barriers extending substantially along an equipotential surface, and each barrier, except the smallest enclosing the smaller barriers and a coil of larger outside dimension than any contained within a smaller barrier.

10. In an electrical apparatus, a core structure of magnetic material, a winding comprising a plurality of flat coils surrounding a portion of said core structure and arranged along a common axis, a plurality of insulating barriers extending substantially along equipotential surfaces between such coils and said core, said barriers being formed to follow said equipotential surfaces between adjacent coils.

11. In an electrical apparatus, a core structure of magnetic material having a winding leg, a winding extending from a high-voltage terminal to a ground terminal and comprising a plurality of flat coils surrounding said winding leg and arranged along a common axis, the coils being so graded in size as to provide an increased spacing of the coils from said core as the high voltage end of the winding is approached, and continuous insulating barriers positioned about the end and side of said winding between said winding and said core, and extending substantially along equipotential surfaces, said several barriers extending different distances along said winding from the high voltage region thereof to provide a decreasing number of barriers between said winding and said core as the low voltage region of the winding is approached.

12. In an electrical apparatus, a winding comprising a plurality of stacks of coils, each coil stack comprising a plurality of flat coils of graded widths, the coil of least width within each coil stack being connected to a line terminal, and nested insulating barriers for said coil stacks comprising a series of barriers of increasing size, the smaller barriers surrounding the smaller coils, and each larger barrier surrounding at least one coil not included within a smaller barrier.

13. In an electrical apparatus, a winding comprising a pair of coil stacks, each coil stack comprising a plurality of flat coils of graded widths, corresponding ends of said coil stacks being positioned adjacent one another and connected together, and nested insulating barriers for said coil stacks, each barrier being arranged about certain of said coils substantially along equipotential surfaces of the electrostatic field.

14. In an electrical apparatus, a winding comprising a pair of stacks of coils, the coils of each coil stack being of progressively increasing width, said coil stacks being positioned along a common axis, with the smaller coils nearer the center, and a series of nested insulating barriers of progressively increasing size positioned substantially along equipotential surfaces of the electrostatic field of said winding.

15. In an electrical apparatus, a winding comprising a plurality of flat coils of graded widths spaced along a common axis, and a series of nested insulating barriers for said winding each larger barrier of the series enclosing the lesser barriers and a coil larger than any contained within a lesser barrier, the coils of said winding as viewed at right angles to the axis thereof being so graded in size that the edges of the stack are rounded inwardly from the smaller toward the larger coils.

16. In an electrical apparatus, a winding comprising a stack of coils arranged along a common axis, and a series of insulating barriers for said coils, each barrier being arranged to enclose a different number of coils than the other barriers, certain of said barriers extending, at one end, between an adjacent pair of coils, then about one end of the coil stack, and then between a coil of said pair and a coil adjacent to said pair of coils.

17. In an electrical apparatus, a winding comprising a stack of coils connected together, a core structure of magnetic material extending through the winding, and a plurality of insulating barriers of different dimensions between said winding and said core, certain of said barriers extending, at one end, between an adjacent pair of coils, then about one end of the coil stack, and then between a coil of said pair and a coil adjacent to said pair of coils.

In testimony whereof, I have hereunto subscribed my name this 2nd day of October 1931.

HENRY V. PUTMAN.